United States Patent [19]

Ishihara et al.

[11] 4,050,910
[45] Sept. 27, 1977

[54] APPARATUS AND METHOD FOR REMOVING PITCH FROM THERMALLY CRACKED GAS

[75] Inventors: Takao Ishihara; Kiyoji Sanpei; Hiroshi Nabatame; Shoichi Motokawa, all of Iwaki, Japan

[73] Assignee: Kureha Kagaku Kogyo Kabushiki Kaisha, Tokyo, Japan

[21] Appl. No.: 732,298

[22] Filed: Oct. 14, 1976

[30] Foreign Application Priority Data

Oct. 14, 1975    Japan .................................. 50-122854

[51] Int. Cl.² ............................................. B01D 46/04
[52] U.S. Cl. .................................... 55/96; 55/242; 55/257 PP; 208/48 R
[58] Field of Search ................. 55/1, 90, 96, 233, 240, 55/242, 241, 257 R, 257 MP, 257 PP, 259; 261/114 A, 111, 113, 116; 208/48

[56] References Cited

U.S. PATENT DOCUMENTS

| | | | |
|---|---|---|---|
| 3,064,408 | 11/1962 | Erga et al. ........................ | 261/114 R |
| 3,174,924 | 3/1965 | Clark et al. ............................ | 208/48 |
| 3,524,301 | 8/1970 | Jalma ..................................... | 55/238 |
| 3,941,572 | 3/1976 | Uchiyama et al. ................... | 261/113 |
| Re. 16,315 | 4/1926 | Senseman .............................. | 55/240 |

OTHER PUBLICATIONS

Smith et al., All–Glass Bubble Cap Column in Chemical Engineering 2/51 pp. 155–157.

*Primary Examiner*—Bernard Nozick
*Attorney, Agent, or Firm*—Lane, Aitken, Dunner & Ziems

[57] ABSTRACT

A demister is disclosed containing a plurality of bubble-cap trays and a plurality of sieve trays beneath the bubble-cap trays and arranged so that the distance between the uppermost sieve tray and the bottom surface of the lower-most bubble-cap tray is at least twice the distance between adjoining sieve trays. A spray nozzle for washing the bottom surface of the lowermost sieve tray with a cleaning oil is also provided.

2 Claims, 1 Drawing Figure

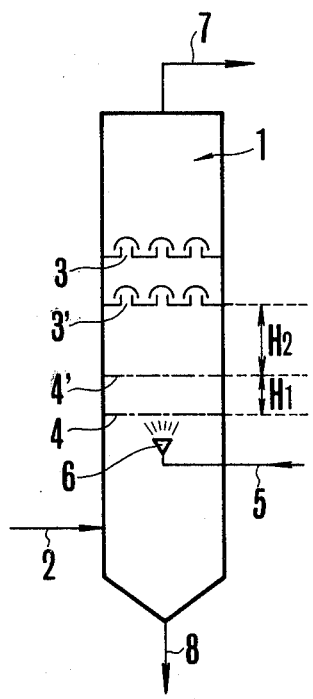

APPARATUS AND METHOD FOR REMOVING PITCH FROM THERMALLY CRACKED GAS

FIELD OF THE INVENTION

This invention relates to an apparatus for removing pitch from a thermally cracked gas obtained in the thermal cracking of a heavy petroleum oil.

BACKGROUND OF THE INVENTION

A process has been proposed recently in which a heavy petroleum oil (such as heavy oil, asphaltene-containing material, etc.) is cracked into pitch and an oil component by subjecting the heavy petroleum oil to the thermal cracking treatment in a reactor. In such process, a thermally cracked gas (cracked oil and gas) is released in the form of vapors from the top of the reactor, and naturally, pitch (in the form of droplets) is entrained in the flow of the thermally cracked gas.

Heretofore, in order to remove such pitch from the thermally cracked gas thus released, it has been general practice to pass the thermally cracked gas through an apparatus such as venturi scrubber or cyclone to catch and collect the pitch component in the apparatus. According to such system, however, it is extremely difficult to reduce the amount of pitch contained in the thermally cracked gas to a satisfactorily low level, for example not more than 500 ppm.

SUMMARY OF THE INVENTION

The object of this invention, therefore, is to provide an apparatus whereby the pitch carried in the thermally cracked gas can be removed from the thermally cracked gas with extremely high efficiency.

This and other objects and features of the present invention will become apparent from a review of the following detailed description of the invention.

In the course of a study aimed at attaining the above object, we have developed an improved demister and have found that pitch can be removed most efficiently from a thermally cracked gas containing the pitch when the gas is passed through this demister.

According to this invention, there is provided an apparatus for removing pitch carried in a thermally cracked gas from the gas, including a cylindrical demister provided with a gas discharge port at the top thereof and a gas inlet port at the lower part thereof and also interiorly having bubble-cap trays arranged in the upper portion thereof and located beneath the gas discharge port, and sieve trays in the lower portion thereof and located above the gas inlet port. This demister has a structure wherein the distance between the underside of the bubble-cap tray of the lowermost stage and the upper surface on the sieve tray of the uppermost stage is at least twice the distance between adjoining sieve trays and is provided with a nozzle for injecting a hot cleaning oil upwardly is provided between the gas inlet port and the sieve tray of the lowermost stage.

BRIEF DESCRIPTION OF THE DRAWING

The accompanying drawing is a schematic illustration of an embodiment of the apparatus according to this invention.

DETAILED DESCRIPTION OF THE INVENTION

Generally, the ordinary type demisters are cylindrical in the configuration and have a gas discharge port at the top thereof and a gas inlet port at the lower part thereof. The demisters are also interiorly provided with bubble-cap trays arranged in the upper portion thereof as is shown in the accompanying drawing and located lower than the gas discharge port and with sieve trays also arranged in the lower portion thereof and positioned above the gas inlet port.

The apparatus of this invention is an improved version of such conventional type demisters. The improvements embodied in the apparatus of this invention include the distance between the underside of the lowest bubble-cap tray and the top of the uppermost sieve tray which is at least twice the distance between the adjoining sieve trays and a nozzle adapted for injecting a hot cleaning oil upwardly which is provided between the gas inlet port and the lowest sieve tray.

Now, the apparatus according to this invention will be described in further detail with reference to the accompanying drawing.

In the drawing, reference numeral 1 indicates the body of the apparatus according to this invention, 2 an inlet pipe for feeding the thermally cracked gas at 400° to 450° C supplied from a reactor, 3, 3', . . . a plurality of bubble-cap trays, 4, 4' . . . a plurality of sieve trays, 5 a hot cleaning oil feed pipe, 6 a nozzle for injecting a hot cleaning oil upwardly, 7 a discharge pipe for a thermally cracked gas (cracked oil and gas) cleared of pitch, and 8 a bottom oil discharge pipe. $H_2$ indicates the distance between the bottom surface of the lowest bubble-cap tray and the upper surface of the top sieve tray, and $H_1$ indicates the distance between all adjoining sieve trays. The distance $H_2$ is at least twice the distance $H_1$.

In actually setting the distances $H_2$ and $H_1$, it is found preferable for obtaining the best results that $H_2$ be greater than 1000 mm and $H_1$ be less than 500 mm. Cleaning oil injected from the nozzle 6 is heated to 200° to 300° C. Such cleaning oil may be of any known type if it is liquid at a temperature of 200° to 300° C. For instance, light oils are preferably used for the purpose of this invention. The hot cleaning oil is sprayed from the nozzle 6 against the bottom surface of the sieve tray of the lowermost stage to clean the bottom surface (where pitch contained in the thermally cracked gas is most likely to deposit). Thus, the injection of such hot cleaning oil prevents pitch from depositing on the bottom surface. The injection rate of the cleaning oil is suitably adjusted within the range of 0.1 to 1.0 $m^3$/hour per unit area (1 $m^2$) of the bottom surface of the lowermost-positioned sieve tray. If the injection rate is lower than 0.1 $m^3$/hour per unit area (1 $m^2$), there could occur coking of the pitch deposited on the bottom surface which would interfere with normal long-time operation, while an injection rate of higher than 1.0 $m^3$/hour per unit area (1 m2) unfavorably encourages congelation of by-produced bottom oil.

The advantage of this invention is obvious from the fact that in use of the conventional type demisters having the bubble-cap trays and sieve trays arranged at usual intervals, trouble in their operation by deposition and coking of the pitch contained in the thermally cracked gas is often encountered, whereas use of the apparatus of this invention has encountered no trouble at all throughout long-time continuous operation.

The apparatus of this invention is now described by way of an embodiment as it was actually adapted for removing pitch from the thermally cracked gas. This embodiment, however, should not be interpreted as limiting in any way the scope of this invention.

EXAMPLE

Pitch contained in the thermally cracked gas released from the reactor used for thermally cracking a vacuum residue of Khafji crude oil with superheated steam was removed from a thermally cracked gas in the following way by using the apparatus shown in the accompanying drawing. The apparatus was a cylindrical demister having an inner diameter of 600 mm and a height of 2000 mm. The mixture of the thermally cracked gas and the steam, which was released from the reactor and had a temperature of about 390° C, was introduced into the lower part of apparatus for gas-liquid contact therein through two stages of sieve trays and two stages of bubble-cap trays. Then, the mixture was released at about 350° C from the top part of the apparatus. Each bubble-cap tray used in this example was composed of seven pieces of 3-inch caps and the same number of 1½ inch risers, while the sieve tray used here was a plate formed with 109 perforations 10-mm in diameter. In this experiment, the thermally cracked gas was treated at the rate of 230 kg/hour (pitch content 5200 ppm) while steam was introduced at the rate of 220 kg/hour. The liquid was refluxed at the rate of 50 kg/hour and at the temperature of 240° C. Tests were carried out by changing the inter-tray distance and the spray rate of the hot cleaning oil. The testing conditions and the results of tests are shown in Table 1 below.

Table 1

| Test No. | Comparative examples | | | This invention | |
|---|---|---|---|---|---|
| | R-1 | R-2 | R-3 | R-4 | R-5 |
| Inter-tray distance $H_1$(mm) | 500 | 400 | 400 | 400 | 400 |
| Inter-tray distance $H_2$ (mm) | 500 | 1000 | 1000 | 1000 | 1000 |
| Spray rate (m³/hour · m²) | — | — | 0.08 | 0.21 | 0.45 |
| Spraying temperature (° C) | — | — | 228 | 240 | 240 |
| Fouling on bubble cap trays* | C | B | B | A | A |
| Fouling on sieve trays* | C | C | B | A | A |
| Pitch in discharge gas (ppm) | 670 | 420 | 360 | 310 | 300 |
| Days of operation | 5 | 5 | 7 | 10 | 10 |

*Indication of the degree of fouling:
A : no fouling;
B : slightly fouled;
C : considerably fouled.

As apparent from Table 1 above, when the trays are arranged with ordinary distance from each other and no spray is used (R-1), the trays are considerably fouled, that is, pitch deposits heavily and is coked on the trays, making the longtime operation hardly possible. Even if the inter-tray distance $H_2$ is widened, almost no anticoking effect is provided when no spray is used (R-2). In case the inter-tray distance $H_2$ is widened but the spraying rate is too low (R-3), although the degree of fouling is somewhat reduced, continued operation over a long period of time is still difficult. On the contrary, the treatments according to this invention (R-4, R-5) perfectly prevented fouling throughout the 10-day operation. The conditions in R-5 could maintain the antifouling effect even over a one-month period of operation.

What is claimed is:

1. A process for removing pitch from a gas derived from the thermal cracking of petroleum oil comprising:
    passing the gas with the entrained pitch through a demister containing a plurality of bubble-cap trays and a plurality of sieve trays mounted below the bubble-cap trays, the distance between the lower surface of the lowermost bubble-cap tray and the upper surface of the uppermost sieve tray being at least twice the distance between adjoining sieve trays; and
    spraying a cleaning oil against the lower surface of the lowermost sieve tray at a rate of 0.1 to 1.0 m³/hr. per unit area $m^2$ of the bottom surface of the lowermost sieve tray to prevent deposition of pitch.

2. A demister for removing pitch from gas obtained by the thermal cracking of petroleum, the demister comprising:
    a cylindrical housing;
    a plurality of bubble-cap trays mounted within said cylindrical housing;
    a plurality of sieve trays mounted within said cylindrical housing below said bubble-cap trays and arranged so that the distance between the bottom surface of the lowermost bubble-cap tray and the top surface of the uppermost sieve tray is at least twice the distance between adjoining sieve trays;
    means for introducing the thermally cracked gas into said cylindrical housing at a point below the lowermost sieve tray;
    means for removing gas from the demister at a point above the uppermost bubble-cap tray; and
    means for injecting hot cleaning oil upwardly against the bottom surface of the lowermost sieve tray, said injection means being located between said means for introducing the thermally cracked gas and the lowermost sieve tray.

* * * * *